Patented July 18, 1950

2,515,857

UNITED STATES PATENT OFFICE 2,515,857

COMPOUNDS HAVING A CARBOXYALKYL-THIO OR A CARBALKOXYALKYLTHIO GROUP BONDED TO SILICON THROUGH HYDROCARBON

William James Burke, Athens, Ohio, and William August Hoffman, Kenmore, N. Y., assignors to E. I. du Pont de Nemours & Company, Wilmington, Del., a corporation of Delaware No Drawing. Application November 26, 1946, Serial No. 712,242

11 Claims. (Cl. 260—46.5)

1

This invention relates to organosilicon compounds.

Organosilicon compounds having carboxyl groups attached to silicon thru linkages not subject to hydrolysis have hitherto not been known. Silicon compounds of this type afford interesting possibilities for reaction with diamines and glycols to form useful condensation products.

This invention has as an object the preparation of new organosilicon compounds. A further object is the preparation of organosilicon compounds having carboxyl groups attached to silicon through linking radicals which are stable to hydrolysis. Other objects will appear hereinafter.

These objects are accomplished by the following invention wherein an organosilicon compound having from one to four alkenyl groups directly attached to each silicon atom is reacted with a carboxyalkylthiol or a carbalkoxyalkylthiol.

In the preferred manner of carrying out the invention, mercaptoacetic acid or an ester thereof is reacted with a silane containing one to four allyl groups, any remaining valences of silicon being satisfied by hydrocarbon radicals having fewer than eight carbon atoms. The reactants are allowed to remain in contact for a length of time sufficient to insure the desired degree of reaction, after which the products are isolated in a suitable manner.

The following examples in which parts are by weight are illustrative of the invention.

Example I

Five parts of diallyldiethylsilane, B. P. 88°/42 mm., and 10.5 parts of ethyl mercaptoacetate were placed in a reaction vessel, 0.1 part of ascaridole was added and the mixture allowed to stand at room temperature for 15 days. Then, after heating the reaction product at 150° C./17 mm. under a nitrogen atmosphere to remove unreacted materials, there was obtained 11 parts of clear liquid, which was found to contain 6.6% silicon and 15.9% sulfur. Calculated for diethylbis(carbethoxymethylthiopropyl)silane:

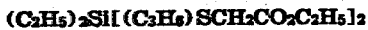

Si, 6.9%, S, 15.7%.

Five parts of the product obtained by reacting 120 parts of ethyl mercaptoacetate with 168 parts of diethyldiallylsilane was heated for 6 hours in a reaction vessel at atmospheric pressure with 2.58 parts of a 61.33% methanol solution of hexamethylenediamine, during which time 1.7 cc. of

2 liquid was collected in the distillate. The pressure was then reduced to 1 mm. and the heating continued at 150° C. for 8 hours with nitrogen bubbling through the reaction mixture. The resulting resin was a light yellow-colored, tough, rubbery solid, insoluble in the common organic solvents such as benzene, butanol, ethyl acetate, and methyl ethyl ketone. The product analyzes Si, 5.60%; N, 6.90%; S, 13.5%. Theory for the product Si, 6.48%; N, 6.47%; and S, 14.8%.

Example II

Ten parts of polydiallylsiloxane, prepared by hydrolysis of diallyldichlorosilane dissolved in 10 parts of xylene, and 22 parts of mercaptoacetic acid were placed in a reaction flask, 0.1 part of ascaridole was added and the mixture allowed to stand at room temperature for 7 days. The solid product thus formed was washed with water to remove unreacted mercaptoacetic acid and dried. The insoluble, infusible product contained 6.5% sulfur and 15.8% silicon, indicating that approximately one-fourth of the allyl groups of the polysiloxane had reacted with the thiol.

In the practice of this invention silicon compounds substituted with alkenyl groups containing up to eighteen carbon atoms may be employed, e. g. monovinyltriethylsilane, diallyldimethylsilane, di-(2-heptenyl)diethylsilane, di-(9-octadecenyl)-dimethylsilane, and the like. Those containing alkenyl groups of up to four carbons, e. g., allyl or methallyl groups, attached to silicon are preferred, however, because of their greater reactivity and ease of preparation. Any remaining valences of the silicon atom can be satisfied by oxygen, as indicated above, or by hydrocarbon groups containing up to eighteen carbon atoms.

The alkenylsilicon compound is reacted in the process of this invention with a monomercapto aliphatic monocarboxylic acid or an aliphatic alcohol ester thereof. The mercapto compounds suitable for use in this invention include mercaptoacetic acid, methyl mercaptoacetate, beta-methoxyethyl mercaptoacetate, butyl mercaptoacetate, heptyl mercaptoacetate, hydroxyethyl mercaptoacetate, phenyl mercaptoacetate, lauryl mercaptoacetate, ethyl alpha-mercaptobutyrate and ethyl alpha-mercaptostearate. The mercapto group may or may not be attached to the alpha carbon of the acid. However, the alpha mercaptoacids or their esters and particularly mercaptoacetic acid and esters thereof prepared from alkanols having up to seven carbon atoms are preferred since they react with ease and are more readily synthesized. While complete reaction between the mercaptocarboxylic compound and the silicon compound requires per mole of the silicon compound, one mole of the mercaptocarboxylic compound, multiplied by the number of double bonds in the molecule of the silicon compound in actual practice it has been found desirable to use per mole of the silicon compound at least two, multiplied by the number of double bonds in the silicon compound, moles of the mercapto carboxylic compound.

The reaction can be carried out in the absence of a diluent, or various inert solvents, e. g. dioxane, benzene, toluene, xylene, saturated petroleum fractions and ester solvents may be employed.

While the reaction proceeds in the absence of a catalyst, it has been found advantageous in practice to conduct the reaction in the presence of oxygen or a peroxy compound or both or an azonitrile, e. g., azodiisobutyronitrile, alpha, alpha' - azo - bis(alpha,gamma - dimethylvaleronitrile), etc., since these lead to shortened reaction time.

Suitable peroxy compounds include ascaridole, diethyl peroxide, benzoyl peroxide and per-acetic acid. Temperatures ranging from 10° C. to the boiling point of the solvent used or of one or both of the reactants and pressures ranging from super- to subatmospheric are suitable for carrying out this reaction.

The products from this invention are useful in the preparation of polymers for use in the production of films, fibers, plastics, and protective coatings.

The term "extracatenic" from "extra"—outside of—and "catenic," the adjective corresponding to "catena"—chain—is used in the claims to refer to valences of atoms not employed in forming links in the chain of atoms but employed in bonding a chain atom to an atom outside the chain.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Diethyl bis - (carbethoxymethylthiopropyl) silane.

2. A polymeric siloxane having on silicon carbomethoxymethylthiopropyl groups and prepared by the addition of methyl mercaptoacetate to polymeric diallylsiloxane.

3. A dialkyl bis(carbalkoxymethylthioalkyl) silane having the carbalkoxymethylthio group bonded to silicon through a bivalent saturated aliphatic hydrocarbon radical containing 2 to 18 carbon atoms.

4. A silane having at least one carbalkoxymethylthiopropyl group attached to silicon, any remaining valences of the silicon being satisfied by alkyl groups.

5. A silane having at least one carbalkoxymethylthio group bonded to silicon through a bivalent saturated aliphatic hydrocarbon radical of 2-18 carbon atoms, any remaining valences of the silicon being satisfied by alkyl groups.

6. A silane having at least one carbalkoxymethylthio group bonded to silicon through a bivalent saturated aliphatic hydrocarbon radical of 2-18 carbon atoms, any remaining valences of the silicon being satisfied by a monovalent hydrocarbon radical having not more than seven carbons.

7. Process for the preparation of organic compounds of silicon and sulfur wherein an organic compound of silicon having on silicon an allyl group, any remaining valences of the silicon being satisfied by a monovalent hydrocarbon radical having not more than seven carbons, is reacted with a mercaptoacetic acid ester of an aliphatic alcohol.

8. Process for the preparation of organic compounds of silicon and sulfur wherein an organic compound of silicon having on the silicon an alkenyl group of up to eighteen carbon atoms, any remaining valences of the silicon being satisfied by a monovalent hydrocarbon radical having not more than seven carbons, is reacted with a mercaptoacetic acid ester of an aliphatic alcohol.

9. Process for the preparation of organic compounds of silicon and sulfur wherein an organic compound of silicon having on the silicon an alkenyl group of up to eighteen carbon atoms, any remaining valences of the silicon being satisfied by a monovalent hydrocarbon radical having not more than seven carbons, is reacted with a member of the class consisting of monomercapto aliphatic monocarboxylic acids and aliphatic alcohol esters thereof.

10. An organic silicon compound containing carbalkoxymethylthio groups bonded to the silicon through a bivalent saturated aliphatic hydrocarbon radical containing 2-18 carbon atoms, said silicon compound being selected from the class consisting of monosilicon compounds each remaining valence of which is satisfied by a hydrocarbon radical of up to eighteen carbon atoms and polysiloxanes having a chain of alternating oxygen and silicon atoms, the extracatenic valences of the silicon atoms of the polysiloxane chain not satisfied by the carbalkoxymethylthioalkyl group being satisfied by hydrocarbon radicals of up to eighteen carbon atoms.

11. An organic silicon compound containing, bonded to the silicon atom through a bivalent saturated aliphatic hydrocarbon radical of 2-18 carbon atoms, a group of the class consisting of carboxyalkylthio and carbalkoxyalkylthio groups, said silicon compound being selected from the class consisting of monosilicon compounds each remaining valence of which is satisfied by a hydrocarbon radical of up to eighteen carbon atoms and polysiloxanes having a chain of alternating oxygen and silicon atoms, each remaining extracatenic valence of the silicon atoms of the polysiloxane chain being satisfied by hydrocarbon radicals of up to eighteen carbon atoms.

WILLIAM JAMES BURKE.
WILLIAM AUGUST HOFFMAN.

REFERENCES CITED

The following references are of record in the file of this patent:

Mayo, Chemical Reviews, vol. 27, 1940, pages 387 to 394.